Oct. 2, 1956  O. D. DOERNER  2,765,009
LATHE AND DRILL PRESS ASSEMBLY
Filed Oct. 29, 1953  2 Sheets-Sheet 1
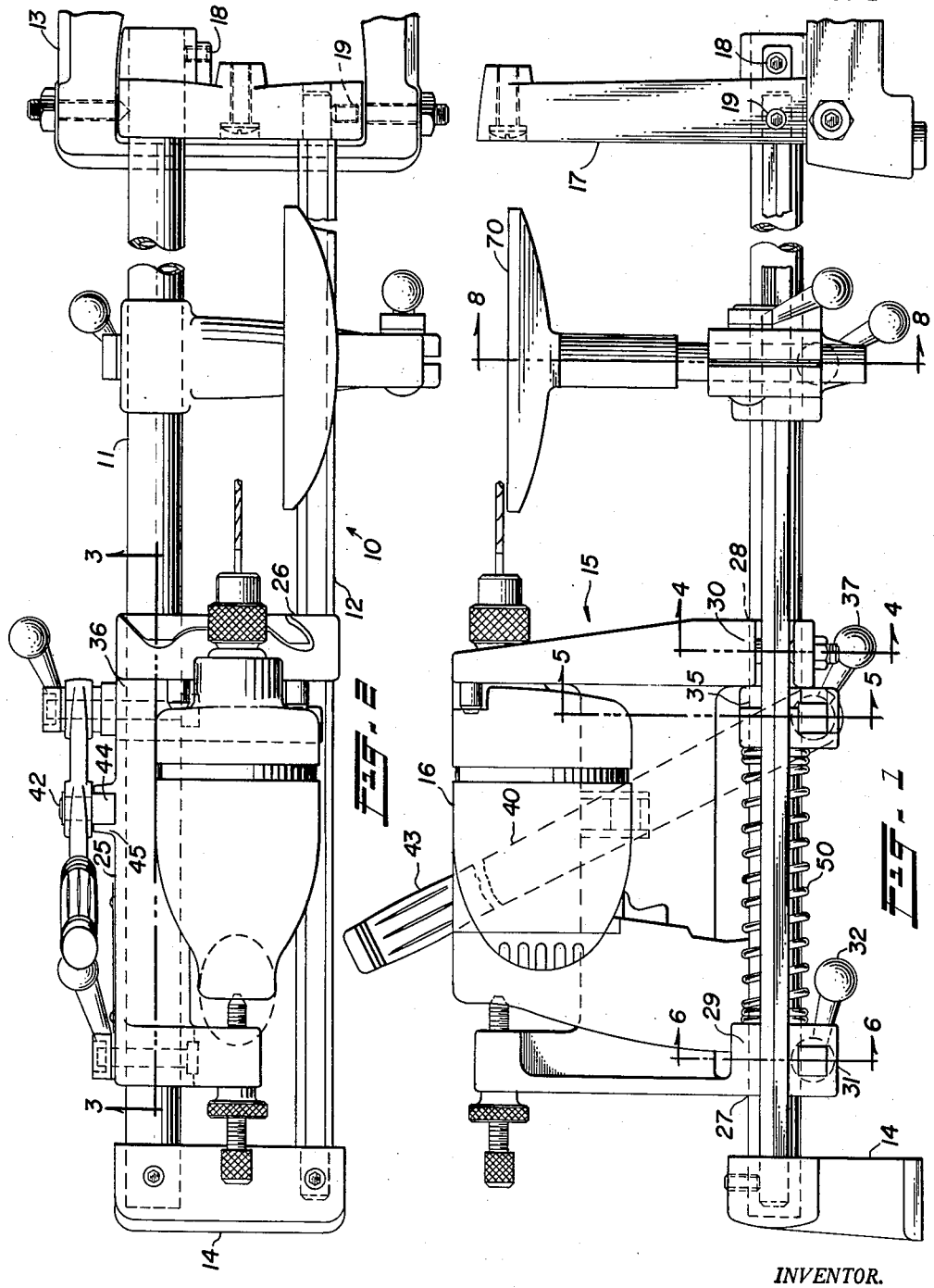
INVENTOR.
OTTO D. DOERNER
BY
Carlson, Pitzner, Hubbard & Wolfe
Attorneys Oct. 2, 1956  O. D. DOERNER  2,765,009
LATHE AND DRILL PRESS ASSEMBLY
Filed Oct. 29, 1953  2 Sheets-Sheet 2
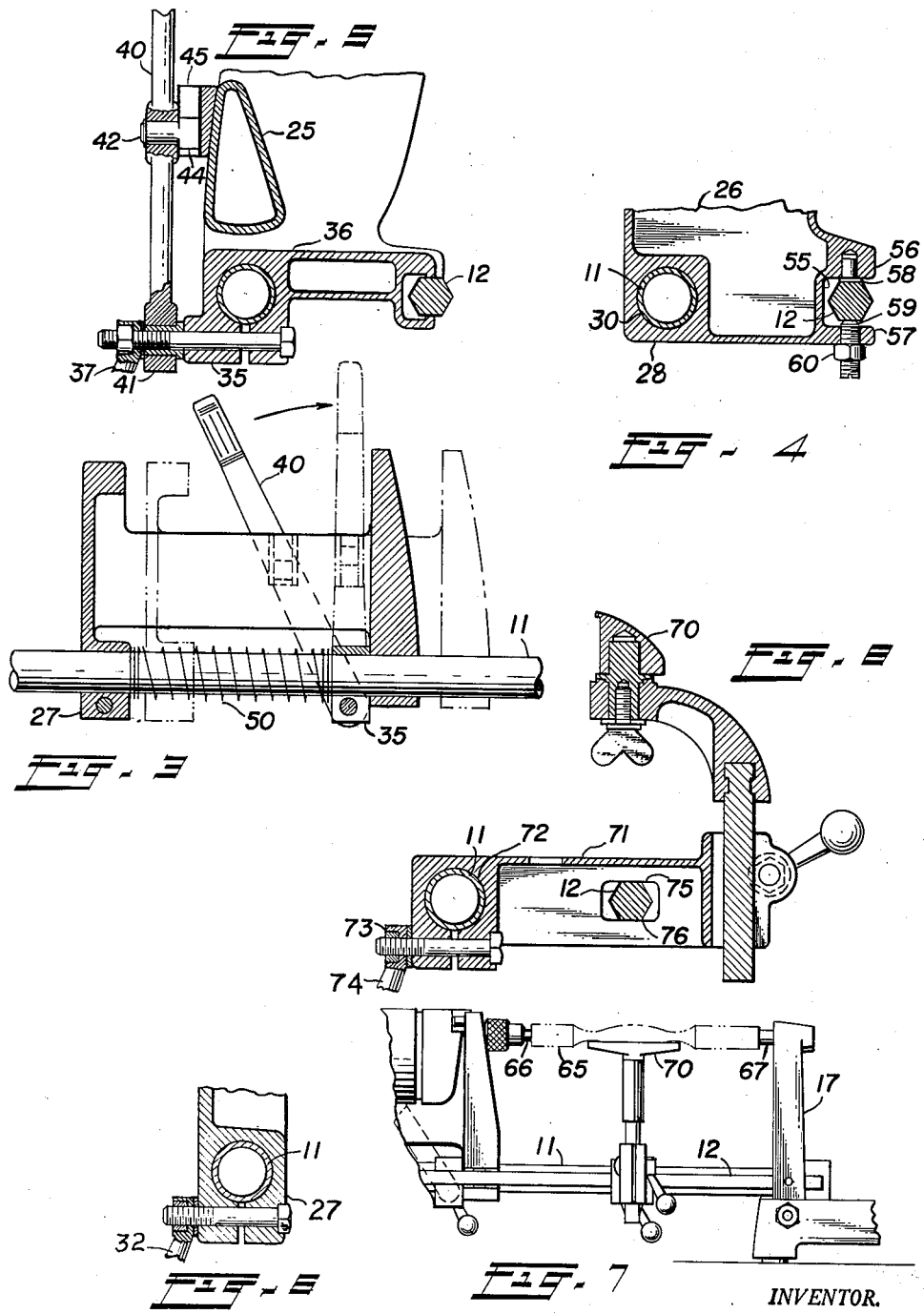
INVENTOR.
OTTO D. DOERNER United States Patent Office 2,765,009
Patented Oct. 2, 1956

2,765,009

LATHE AND DRILL PRESS ASSEMBLY

Otto D. Doerner, Chicago, Ill., assignor, by mesne assignments, to John Oster Manufacturing Co., Racine, Wis., a corporation of Wisconsin Application October 29, 1953, Serial No. 389,025

3 Claims. (Cl. 144—92)

The present invention relates to lathe and drill press assemblies, and more particularly to machines of the movable tool carriage type.

An object of the present invention is to provide a lathe and drill press assembly of the movable tool carriage type having an improved way bar arrangement for guiding and supporting the tool carriage, tool rests and the like. More particularly, it is an object of the present invention to provide a lathe and drill press assembly in which the tool carriage is movably mounted for advancement of a rotating tool, yet firmly anchored against unwanted rocking movement. It is another object of the invention to provide a lathe and drill press assembly having a novel way construction which insures free and easy longitudinal movement of the movable tool carriage with absolute freedom from binding, and which, nevertheless, provides a stable rotating tool support with elimination of play and lost motion. It is a further object of the present invention to provide a lathe and drill press assembly possessing the above advantages but which is of simple, inexpensive construction, having fewer critical dimensions than conventional devices of the same general type. Finally, it is an object of the present invention to provide a lathe and drill press assembly which affords a long, trouble-free life with provision for take-up for wear and in which the way surfaces are quickly renewable without trouble or additional expense.

Other objects and advantages of the invention will be apparent upon reference to the attached detailed description and to the drawings, in which:

Figure 1 is an elevation of the lathe and drill press assembly constructed in accordance with the present invtention.

Fig. 2 is a plan view of the device shown in Fig. 1.

Fig. 3 is a section taken along the line 3—3 in Fig. 2 showing the tool carriage in its normal position, the forward position of the tool carriage being shown in dotdash outline.

Fig. 4 is a section of the tool carriage taken along the line 4—4 in Fig. 1.

Fig. 5 is a transverse section of the fulcrum clamp for the feed lever taken along the line 5—5 in Fig. 1.

Fig. 6 is a transverse section taken along the line 6—6 in Fig. 1.

Fig. 7 is a fragmentary elevation showing use of the device as a lathe.

Fig. 8 is a cross section of the tool rest taken along line 8—8 in Fig. 1.

While the invention has been described in connection with a preferred embodiment, it will be understood that I do not intend to limit myself to the construction shown, but intend to cover all modifications and alternatives which are included within the spirit and scope of the appended claims.

Referring now to Figure 1, a lathe and drill press assembly is shown having a lathe bed 10 which includes longitudinal way bars 11, 12. The lathe bed is supported at its right-hand end on a base plate 13 and at its left-hand end on a head support 14. Slidably mounted on the bars 11, 12 is a tool carriage 15, which carries a portable drill 16 securely clamped in position. Arranged opposite the tool carriage 15 is a tailstock 17. The latter is bored to receive the bars 11, 12 which are held in place by means of set screws 18, 19. For present purposes it will suffice to say that the tailstock 17 may be used as a work support for either drilling or turning operations, further features of the tailstock and base plate being covered in a co-pending application, Serial No. 385,807, filed October 13, 1953, in the name of Paul C. Jones.

Giving attention to the tool carriage, it will be seen upon inspection of Fig. 2 that it is more or less L-shaped, having a body 25 which extends longitudinally along the way bar 11 and having an integrally formed transverse portion 26 which extends laterally into contact with the opposite bar 12. Depending from the body 25 are brackets 27, 28, which are bored at 29, 30, respectively, to form sleeves which snugly embrace the bar 11 at points rather widely spaced from one another (Figs. 4 and 6). For the purpose of clamping the carriage firmly to the bar 11, a clamp 31 is provided in the bracket 27. This clamp, which is shown in detail in Fig. 6, is operated by a manual lever 32.

For the purpose of positioning the carriage in a normal position while permitting a limited range of movement, a fulcrum clamp 35 is provided. This fulcrum clamp, a cross section of which is shown in Fig. 5, has a body 36 and a manual operated clamping arm 37. In order to produce advancement of the carriage relative to the fulcrum clamp 35, a feed lever 40 is provided having its lower end 41 pivoted to the fulcrum clamp 35 and having its mid portion pivoted at 42 to the body 25 of the carriage. The feed lever is provided with a handle 43 at its outer end, clockwise movement of the handle causing the carriage to be advanced forwardly. To permit the pivot 42 to move vertically as the feed lever 40 is swung in a clockwise direction, such pivot is mounted on a sliding block 44 which is received in a vertical slide 45 machined in the side of the carriage.

A return spring 50 is provided for resiliently opposing advancement of the carriage and to return the carriage to its normal position. This return spring is telescoped over the bar 11 and is interposed between the bracket 27 on the carriage and the fulcrum clamp 35. It will be apparent that with the fulcrum clamp 35 clamped in position and with the clamp 31 released, forward swinging movement of the feed lever will cause the return spring 50 to compress. Because of the spacing between the bracket 27 and fulcrum clamp, the carriage may be advanced through relatively wide range. To extend this range it is sufficient to release the fulcrum clamp 35, moving the fulcrum clamp and carriage bodily to a new position along the bars 11, 12.

In accordance with the present invention, the bar 12 is made of hexagonal shape, providing opposed flat surfaces for engaging and guiding the transverse portion 26 of the carriage. Further in accordance with the invention, the carriage is provided with a pair of flat surfaces of limited area which are opposed to one another and which are arranged to engage opposite sides of the hexagonal bar 12. Such construction is shown in Fig. 4, where it will be noted that the transverse portion 26 of the carriage has a C-shaped groove 55 providing upper and lower opposed walls 56, 57. Mounted on the wall 56 is a flat button 58 which may be formed of bronze or other wear-resisting material suitably secured in place. Oppositely arranged with respect to the wear surface on the button 58 is an adjustable wear member 59 having a flat button-like surface. The wear member 59 is preferably in the form of an adjustable stud, as shown and is provided with a locking nut 60. It will be apparent to one skilled in the art that any wear at the surfaces 58, 59 may be taken up simply by advancing the adjustable stud.

In accordance with one of the features of the present invention, the hexagonal rod 12 is turned down at its ends to cylindrical shape (see Figs. 1 and 2) in order to enable the rod to be rotated, and thereby present a new pair of way surfaces whenever the original way surfaces become worn to an objectionable degree. Three separate pairs of way surfaces are thus made available having a total life which exceeds the expected life of the machine as a whole.

It is one of the further features of the present construction that the hexagonal rod 12 need not be accurately spaced with respect to the cooperating rod 11, and need not lie in precisely the same plane. It will be apparent upon inspection of Fig. 4 that any error in spacing between the two rods is simply taken up by relative lateral movement between the wear members 58, 59 and the hexagonal rod 12. In addition, the tool carriage may be adjusted up and down through a small range simply by changing the effective thickness of the wear member 58, making a compensating adjustment in the wear member 59. This feature insures vertical alinement of carriage and tailstock.

The present construction not only permits ease of adjustment, but insures absolute freedom from binding. It is to be particularly noted that the tool carriage engages the rod 12 at a single "point of support" along the length of the latter. Thus, a single adjustment suffices to level the carriage and it is not necessary to make any compensating adjustment at some other point along the length of the hexagonal rod 12. In short, there is no possibility that plural adjustments will tend to "fight" one another. This enables the device to be successfully operated and adjusted by one having little or no skill in this field. In addition, the "tripod" nature of the carriage support eliminates binding even when the parallel bars 11, 12 are slightly twisted or skewed with respect to one another. This is a feature which is particularly important in a device of the present type intended to be operated either in the horizontal position or in the vertical position. It must be kept in mind that the tool may be mounted by an amateur enthusiast having little knowledge of the fine points of machine installation and on a bench surface which is warped or irregular. It is possible therefore that head support 14 may not be supported perfectly parallel to the horizontal axis pivot at the other end of the lathe bed. Then, too, there is the possibility that chips and foreign matter may collect on the work table, preventing the head support 14 from seating in level position. Under such circumstances the bars may skew slightly relative to one another. Whatever may be the reason for the skewing, it will be apparent to one skilled in the art that the present construction obviates the binding which would otherwise occur.

The way construction used for the tool carriage is equally advantageous when it comes to supporting tool rests and similar attachments. By way of example reference is made to Fig. 7 which shows the present assembly used as a lathe. Here the workpiece 65 is engaged at its left-hand end and by a live center 66, at its right-hand side by a dead center 67, the latter being received in an alined bore formed in the tail stock 17. For supporting a tool relative to the workpiece, a tool rest 70 is provided engaging both the round way bar 11 and the hexagonal way bar 12, as shown in Fig. 8. Such tool rest has a body 71 having a bore 72 telescoped over the cylindrical rod 11, the tool rest being clamped to the rod by a clamp 73 having an operating lever 74. The body 71 of the tool rest extends forwardly beyond the hexagonal bar 12 and embraces the bar by upper and lower surfaces 75, 76 respectively, lateral clearance being provided as shown. This structure provides a tool rest which is safe and secure and which may be readily moved along the ways simply by loosening the lever 74 and sliding the rest bodily along. The surfaces 75, 76 which engage the hexagonal rod 12 are of limited extent producing many of the same advantages as the surfaces on the wear members 58, 59 previously discussed. Most importantly, binding of the tool rest along the ways is eliminated even though the two bars 11, 12 may be slightly skewed with respect to one another.

While the present invention has been described in connection with a movable tool carriage and a movable tool rest, it will be apparent to one skilled in this art that the invention is similarly applicable to other rests, attachments, and features which may be attachable for sliding movement along the ways and which may be required to accomplish more specialized tasks.

I claim as my invention:

1. In a lathe and drill press assembly, the combination comprising a lathe bed including first and second parallel bars, said first bar being of circular cross section and said second bar being hexagonal, a carriage slidably mounted on said first bar, said carriage having a transverse portion presenting flat inwardly facing wear surfaces of limited area engaging upper and lower way surfaces on said second bar, said second bar being rotatably positionable to enable selection between three pairs of flat way surfaces thereon.

2. In a lathe and drill press assembly, the combination comprising a lathe bed having first and second way bars extending parallel to one another, said first bar having a circular cross section, a carriage having a pair of alined sleeves snugly telescoped over said first bar and longitudinally spaced therealong, means for advancing said carriage relative to said lathe bed, said carriage having a transversely extending arm having opposedly facing wear members thereon for engaging opposite surfaces on said second bar, said second bar being of hexagonal cross section and rotatably mounted in said lathe bed to present three alternative pairs of flat way surfaces to said wear members.

3. In a lathe and drill press assembly: a lathe bed comprising first and second horizontal way bars connected together in spaced substantially parallel relationship, the first bar having a circular cross section and the second bar having uniformly spaced upper and lower guide surfaces thereon; a head stock comprising a carriage having an elongated upright body; means mounting the carriage on the lathe bed for easy sliding adjustment of the carriage lengthwise along the bars without danger of binding due to variations in the spacing of the bars from true parallelism, said carriage mounting means comprising a pair of brackets, one joined to each end portion of the carriage body and depending therefrom, said brackets having aligning bores in which said first bar is slidingly received to support the carriage at two points on the lathe bed spaced apart a substantial distance along the length of said first bar, an arm fixed on the carriage and extending laterally therefrom toward said second bar, and spaced upper and lower jaws on the outer end of said arm opening laterally away from said first bar and embracing said second bar with the jaws in sliding engagement with said upper and lower guide surfaces on said second bar, said jaws precluding rotation of the carriage about the axis of the first bar and providing a third support for the carriage at a single point on said second bar; a fulcrum clamp extending transversely between and conjointly carried by said bars with the clamp in spaced relation to the body of the carriage, at a location intermediate the brackets thereon and directly adjacent to one of said brackets, said clamp being connected with both said first and second bars to be constrained thereby to sliding motion lengthwise of the bars independently of the carriage, and said clamp having means thereon for releasably locking the same to one of the bars; a lever pivotally carried by said clamp and connected with the carriage to impart sliding motion to the carriage in a direction to carry said one bracket thereon away from said clamp as a consequence of swinging of the lever in one direction; and a carriage return spring reacting between said clamp and the other bracket to yieldingly resist such lever produced sliding motion of the carriage.

References Cited in the file of this patent

UNITED STATES PATENTS

| | | | |
|---|---|---|---|
| Re. 15,864 | Gran | June 24, | 1924 |
| 457,967 | Hartness | Aug. 18, | 1891 |
| 576,988 | Woodward | Feb. 9, | 1897 |
| 2,200,799 | Miller | May 14, | 1940 |
| 2,477,916 | Wilhide | Aug. 2, | 1949 |
| 2,623,269 | Goldschmidt | Dec. 30, | 1952 |